US009530158B2

(12) United States Patent
Phenner et al.

(10) Patent No.: US 9,530,158 B2
(45) Date of Patent: Dec. 27, 2016

(54) METHOD, SYSTEM, AND GRAPHIC USER INTERFACE FOR ENABLING A CUSTOMER TO ACCESS INFORMATION ASSOCIATED WITH A HOSTED USER PROFILE

(75) Inventors: Chris Phenner, New York, NY (US); Lasse Hamre, New York, NY (US); Mike Park, New York, NY (US)

(73) Assignee: IHEARTMEDIA MANAGEMENT SERVICES, INC., San Antonio, TX (US)

(*) Notice: Subject to any disclaimer, the term of this patent is extended or adjusted under 35 U.S.C. 154(b) by 1044 days.

(21) Appl. No.: 12/417,580

(22) Filed: Apr. 2, 2009

(65) Prior Publication Data

US 2010/0257076 A1    Oct. 7, 2010

(51) Int. Cl.
*G06Q 30/06* (2012.01)
*G06Q 20/12* (2012.01)
*G06Q 30/04* (2012.01)
*H04W 8/20* (2009.01)

(52) U.S. Cl.
CPC .......... *G06Q 30/0603* (2013.01); *G06Q 20/12* (2013.01); *G06Q 30/04* (2013.01); *H04W 8/205* (2013.01)

(58) Field of Classification Search
None
See application file for complete search history.

(56) References Cited

U.S. PATENT DOCUMENTS

| | | | |
|---|---|---|---|
| 7,937,422 B1* | 5/2011 | Ferguson, Jr. | 707/828 |
| 8,484,089 B1* | 7/2013 | Lin et al. | G06Q 30/06 |
| | | | 705/26.1 |
| 2006/0259434 A1* | 11/2006 | Vilcauskas et al. | 705/57 |
| 2007/0245882 A1* | 10/2007 | Odenwald | G06F 17/3074 |
| | | | 84/609 |
| 2010/0161499 A1* | 6/2010 | Holcombe | G06Q 10/10 |
| | | | 705/310 |

\* cited by examiner

*Primary Examiner* — Ryan Zeender
*Assistant Examiner* — Denisse Ortiz Roman
(74) *Attorney, Agent, or Firm* — Garlick & Markison; Edward J. Marshall (57) ABSTRACT

A method, system, GUI, apparatus, and machine-readable media for enabling a customer to access information associated with a hosted user profile via a third party information source are provided. A customer may request information associated with a user profile via a mechanism provided by a third party information source via, for example, a mobile communications device. The customer may be enabled to access the information associated with the hosted user profile and an account associated with the customer may be updated to reflect the access. An account associated with the user may be updated to show the transaction and a statement regarding transactions associated with the user profile may be prepared and presented to the user.

19 Claims, 7 Drawing Sheets

FIG. 3 thumbplay @ open

| DASHBOARD | ARTIST PROFILE | RINGTONES | GRAPHICS | STORE WIDGET | PROMO LINKS | REPORTS | ACCOUNT | HELP |

Sign out

Sweetheart Attack Reports ~420

~405

Please note daily totals are estimates only. Select "Accounting totals" in the menu below to see your final monthly reports. Need help?

415 —

Reporting view: Summary | ptrx | thpcampid | thpcid

Select: [By dates ▾] ~425 ~430 ~435 or

From [01/12/2009] 📅 To [02/12/2009] 📅 [Apply]

440 445

450

| Day | Traffic | Subscriptions | Downloads |
|---|---|---|---|
| 01/12/2009 | 2 | 0 | 0 |
| 01/13/2009 | 7 | 0 | 0 |
| 01/14/2009 | 2 | 0 | 0 |

Copyright 2008 Thumbplay, Inc. | About Thumbplay | Privacy Policy

METHOD, SYSTEM, AND GRAPHIC USER INTERFACE FOR ENABLING A CUSTOMER TO ACCESS INFORMATION ASSOCIATED WITH A HOSTED USER PROFILE

BACKGROUND

Field of Invention

This invention relates to a method, system, graphic user interface (GUI), apparatus, and machine-readable media for enabling a customer to access information associated with a hosted user profile via a third party information source.

Discussion of Related Art

Current media file downloading sources such as iTunes™ and Rhapsody™ offer customers the ability to purchase and download media files. Typically, these downloading sources receive media files from a recording industry representative and not from a user or artist. Once received, a media file may then be processed and uploaded to a website hosted by the downloading source so that they may be viewed and/or purchased by one or more customers. In this way, a user or artist is denied direct access to the downloading source. The lack of direct access to a downloading source causes considerable delay in the time it takes for a media file to get to market. This delay may, in turn, cost the user or artist valuable opportunities and financial benefits. Additionally, the lack of direct access to a downloading source denies a user or artist direct control over a media file they generate or are otherwise associated with.

Other websites, like MySpace.com™ and YouTube.com™, enable users to upload media content that may later be viewed by other users of the website. However, this content is not available for download and/or purchase by a viewing user.

SUMMARY

A method, system, graphic user interface (GUI), apparatus, and machine-readable media for enabling a customer to access information associated with a hosted user profile via a third party information source are provided. Exemplary third party information sources include a third party website, a third party short message service (SMS)/multimedia messaging service (MMS) gateway, and/or a wireless application protocol (WAP) site.

According to one embodiment, a customer may be provided with a mechanism to access the hosted user profile via the third party information source through, for example, a personal or mobile computing device. The user profile may hosted on, for example, a website, a SMS/MMS gateway, and a WAP site. In some cases, the mechanism may be a link or widget that is included on a page displayed by the third party information source. In one embodiment, the mechanism may be provided via a plurality of third party information sources.

A user profile may include information. In some cases, the information may be a media file. Exemplary media files include an MP3 file, a graphic file, a ringtone file, a document file, a game file, a wallpaper file, and a music file. In one embodiment, the information may be a subscription to, for example, information made periodically available on the hosted user profile. In another embodiment, the user profile may be associated with a user account. A user account may include information relating to the transferring of monetary funds to and/or from the user.

A customer may request access to the user profile via, for example, activating or selecting the mechanism. The customer may be provided with access to the user profile in response to the request. The customer may then request to access information associated with a hosted user profile. The customer may enter personal information and this information may be used to associate the customer with a customer account. The customer account may be updated to reflect the requested to access the information and other transactions. In some embodiments, updating a customer account may include charging the customer account an amount of money and receiving payment.

A customer may be enabled to access the requested information. In some embodiments, accessing the information may include downloading the information. One or more transactions may then be cataloged. A user's account may be updated to, for example, indicate a customer's information access. Updating a user account may include, for example, issuing or receiving an electronic funds transfer and/or a paper check that may be, for example, transferred from a payment received by the entity hosting the user profile.

A statement may be prepared for the user. This statement may include information regarding various transactions related to the user profile, information associated with the user profile, and/or a website, a SMS/MMS gateway, and a WAP site like host website 48, SMS/MMS gateway 52, and WAP site 50, respectively including the status or cost of a transaction, and/or any credit due, or debt owed, by the user. In embodiments where a plurality of mechanisms are provided to a user, the statement may include information associated with each of the plurality of mechanisms. The statement may then be provided to the user.

Systems and apparatus for executing the method may include a network and a server computer system. The network may be enabled to facilitate communication between a user, a customer, and a server computer system. The server computer system, may be enabled to provide the customer with a mechanism to access the hosted user profile, wherein the user profile includes information, is associated with a user account, and is hosted on at least one of a website, a SMS/MMS gateway, and a WAP site. The system may also be enabled to receive a request to access the user profile from a customer via the mechanism, provide the customer with access to the user profile, receive a request to access information associated with a hosted user profile, receive personal information from the customer, and associate the customer with a customer account based on the received personal information. The system may be further enabled to update the customer account to indicate the requested access to the information, enable the customer to access the information update the user account to indicate the customer's access to the information, prepare, and provide a statement for the user based on the updated user account information.

BRIEF DESCRIPTION OF DRAWINGS

The present invention is illustrated by way of example, and not limitation, in the figures of the accompanying drawings in which.

DETAILED DESCRIPTION OF THE INVENTION

Figure 1A:
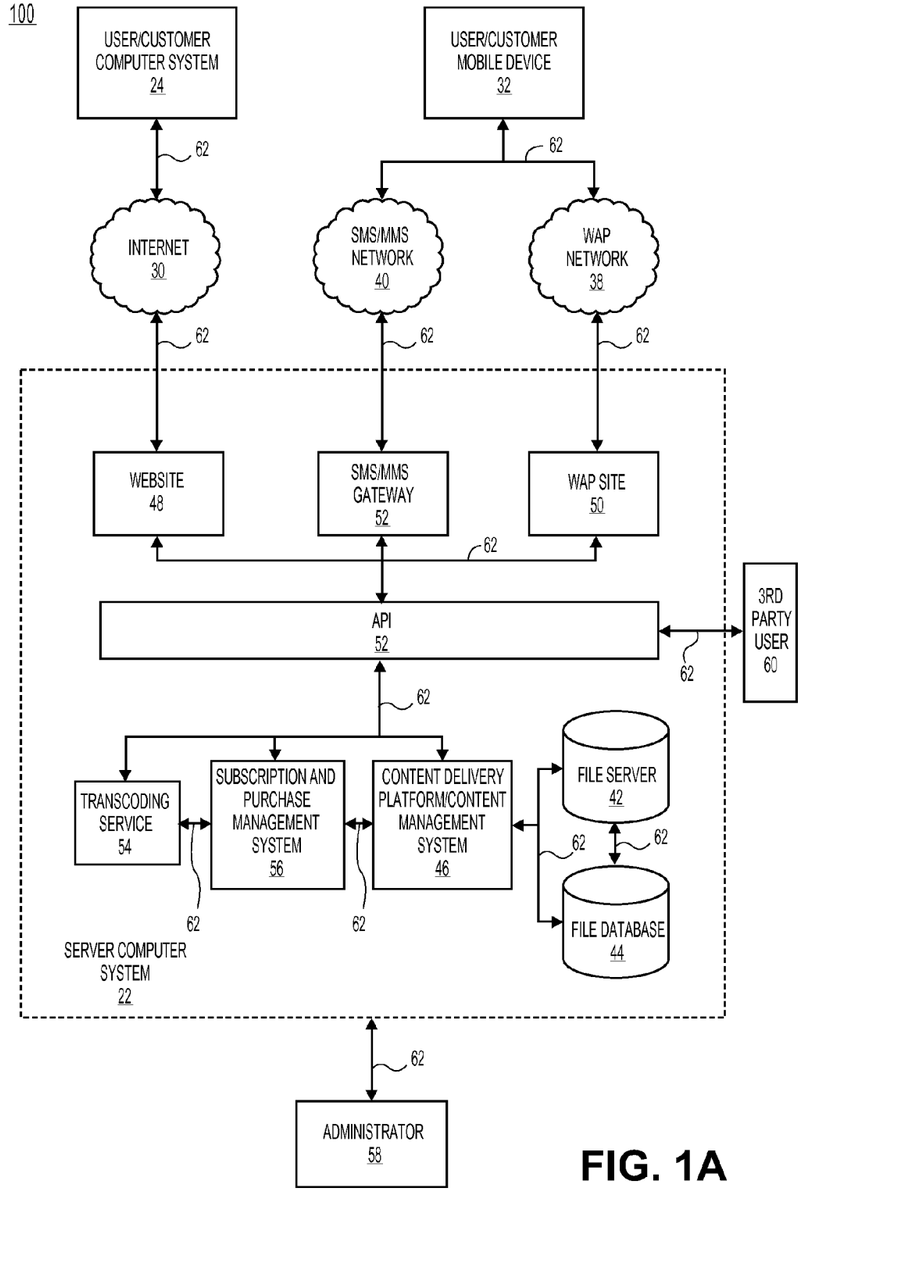
FIG. 1A is a block diagram illustrating a network system in which aspects of the invention are manifested, consistent with an embodiment of the present invention.

FIG. 1A is a block diagram illustrating a network system 10 for enabling a customer to access a media file uploaded by a user to a hosted user profile. System 100 includes a user computer system 24, a user mobile system 32, the Internet 30, a short message service (SMS)/multimedia messaging service (MMS) network 40, a wireless application protocol (WAP) network 38, a server computer system 22, a website 48, a SMS/MMS gateway 52, a WAP site 50, an application programming interface (API) 52, a transcoding service 54, a subscription and purchase management system 56, a content delivery platform and content management system 46, a file server 42, a file database 44, an administrator 58, a third party user 60, and communication links 62.

User computer system 24 may communicate with server computer system 22 via a web site, such as web site 48, over a network, such as Internet 30. User mobile device 32 may communicate with a SMS/MMS gateway, such as SMS/MMS gateway 52 via, for example an SMS/MMS network such as SMS/MMS network 40. User mobile device 32 may also communicate with a WAP site such as WAP site 50 via a WAP network 38 such as WAP network 38.

Server computer system 22 may include a file store in the form of file server 42 and a data store in the form of file database 44. File database 44 may store one or more media files and/or libraries of media files. A library of media files stored by file database 44 may include media files imported directly from, for example, a media distribution company or a record label like Sony Music™ or Universal Studios™. File database 44 may be in communication with file server 42. API 52 may be a set of instructions, protocols, methods, and/or functions that enable system 100 to perform a request from any of the components of system 100.

Content delivery platform and management system 46 may, for example, classify and/or index media files such as ringtones (reduced media content), full-track content, games, wallpaper, graphics, MP3s, and media files using one or more categories. Content delivery platform and management system 46 may provide information to a customer regarding a media file based on, for example, it's classification and/or indexing. Media files to be indexed may be from, for example, a file server such as file server 42. Indexed media files may be stored in, for example, a structured manner that may enable accessing the media file and/or downloading the indexed media file to a website like website 48, a WAP site like WAP site 50, a SMS/MMS gateway like SMS/MMS gateway 52, and/or a transcoding service like transcoding service 54. Indexed media files may be stored in a database like file database 44.

Subscription and purchase management system 56 may include instructions that may enable the managing of subscriptions to, for example, a host website, a user profile, and/or a media file. Subscription and purchase management system 56 may also include instructions that may enable the managing of the purchase of a subscription and/or access to a media file. Subscription and purchase management system 56 may enable the updating of a customer account to indicate, for example, the customers access of a website like website 48, a WAP site like WAP site 50, a SMS/MMS gateway like SMS/MMS gateway 52, a user profile, or a media file. Subscription and purchase management system 56 may also enable providing a customer with access to a good or service when the customer communicates with, for example, a website like website 48, a WAP site like WAP site 50, a SMS/MMS gateway like SMS/MMS gateway 52.

Transcoding service 54 may prepare communication suitable for transmission over internet 30, WAP network 38, and/or SMS/MMS network 40. Administrator 58 may be any administrator of server computer system 22 and may provide instructions to one or more components of server computer system 22. Third party user 60 may be any third party not in communication with to the website 48, SMS/MMS gateway 52 and WAP site 50. Third party user 60 may be enabled to access API 52 via, for example, a widget, API, or link external to server computer system 22.

Communication between one or more components of system 100 may be made via a communication link like communication link 62. Communication links 62 may be any appropriate communication link and may be wired or wireless.

Figure 1B:
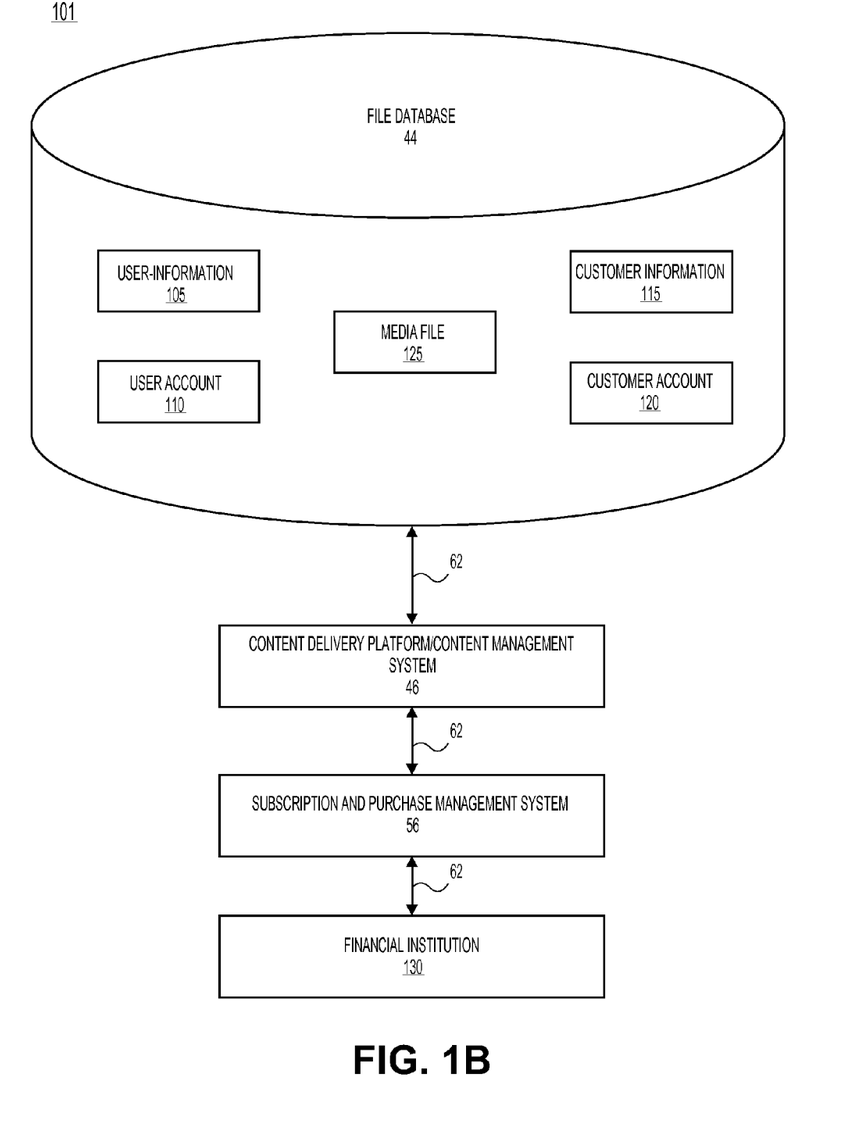
FIG. 1B is a block diagram illustrating a network system enabled to update a user and/or customer account, consistent with an embodiment of the present invention.

FIG. 1B is a block diagram illustrating a network system 101 enabled to update a user and customer account. System 101 may include file database 44, subscription and purchase management system 56, content delivery platform and content management system 46, a financial institution 130, and communication links 62. File database 44 may include, for example, a user information module 105, a user account module 110, a customer information module 115, a customer account module 120, and a media file 125.

Financial institution 130 may be any entity capable of conducting financial transactions such as an electronic or paper funds transfer. Exemplary financial institutions include banks, credit card companies, and PayPal™. Financial institution 130 may be able to access, withdraw, and/or deposit funds related to user account 110 and/or customer account 120. Financial institution 130 may also be able to update a user account module 110 and/or customer account module 120 to reflect, for example, a transaction.

User information module 105 may include information regarding a user. Exemplary information includes login information such as a password and user identification and/or a user profile and/or information associated with a user profile and/or media file. A user profile may include, for example, information regarding the user's interests, a musical group that he or she belongs to, a genre of art that he or she contributes to, and/or information regarding media files he or she has uploaded to the user profile. User information module 105 may be in communication with, for example, user account module 110 and/or media file module 125.

User account module 110 may include, for example, information regarding an account the user has with a host website, SMS/MMS gateway, and/or WAP site such as website 48, SMS/MMS gateway 52, and/or WAP site 50. Information included in user account module 110 may be, for example, a list of media files uploaded to user information module 105, the status of the uploaded media files, how many customers accessed his or her profile and/or uploaded media file, a statement prepared for the user, and any credit or debit account balance owed or due to the user. User account module 110 may be in communication with, for example, user information module 105.

Customer information module 115 may include information regarding a customer. A customer may be any individual and/or entity requesting access to a media file. Exemplary information includes login information such as a password and user identification and/or a customer profile. A customer profile may include, for example, information regarding his or her interests, a genre of art that they contribute to, and/or information regarding media files he or she has uploaded to the user profile. Customer information module 115 may also include information regarding media files access and/or downloaded by the customer and/or a service or periodically issued media file that the customer subscribes to. Customer information module 115 may be in communication with, for example, customer account module 120 and/or media file module 125.

Customer account module 120 may include information regarding an account the user has with a host website, SMS/MMS gateway, and/or WAP site such as website 48, SMS/MMS gateway 52, and/or WAP site 50. Customer account module 120 may also include an accounting of the number of media files accessed by and/or downloaded to customer information module 115, the status of an accessed/downloaded media file, the media files and/or user profiles he or she has accessed, a statement prepared for the customer, and any credit or debit account balance owed, or due to, the customer.

Media file module 125 may include one or more media files uploaded by a user to his or her profile. A media file uploaded to media file 125 may be accessed/downloaded by a customer via, for example, customer information module 115. Exemplary media files include an MP3 file, a graphic file, a ringtone file, a document file, a game file, and a music file. Media file module 125 may be accessed by, for example, user information module 105, and/or customer information module 115.

A user and/or customer may communicate with file database 44, user information module 105, user account module 110, customer information module 115, customer account module 120, and/or media file 125 via, for example, website 48, SMS/MMS gateway 52, and/or WAP site 50 over communication links 62.

Figure 1C:
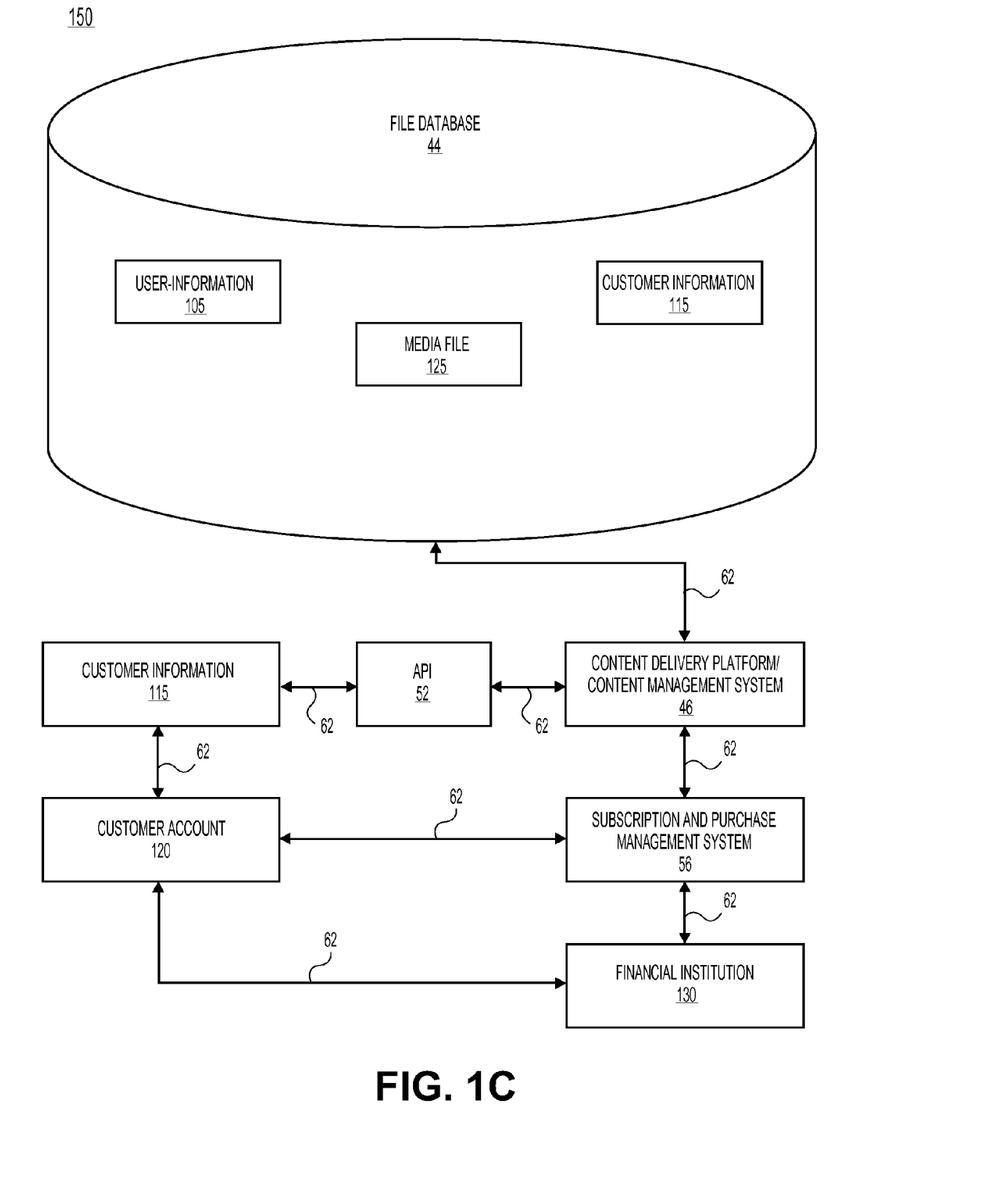
FIG. 1C is a block diagram illustrating a network system enabled to update a user and/or customer account, consistent with an embodiment of the present invention.

FIG. 1C is a block diagram illustrating a network system 150 enabled to update a user and customer account. System 150 may include file database 44, subscription and purchase management system 56, content delivery platform and content management system 46, API 52, financial institution 130, a customer information module 115, a customer account module 120, and communication links 62. File database 44 may include, for example, user information module 105, user account module 110, and media file 125.

Customer information module 115 may communicate with API 52 over communication link 62. This communication may include a request to, for example, access a user profile or access a media file. API 52 may be enabled to communicate with content delivery platform and content management system 46. This communication may include, for example, the request to, for example, access a user profile or access/download a media file and a response to the request. Content delivery platform and content management system 46 may be in communication with subscription and purchase management system 56. This communication may relate to a subscription and/or payment required from the customer to access a requested profile and/or media file. Subscription and purchase management system 56 may be in communication with customer account module 120 and/or financial institution 130 in order to, for example, execute the payment for access a requested profile and/or media file. Once executed, customer account module 120 and/or user account module 110 may be updated to reflect the transaction.

Figure 2:
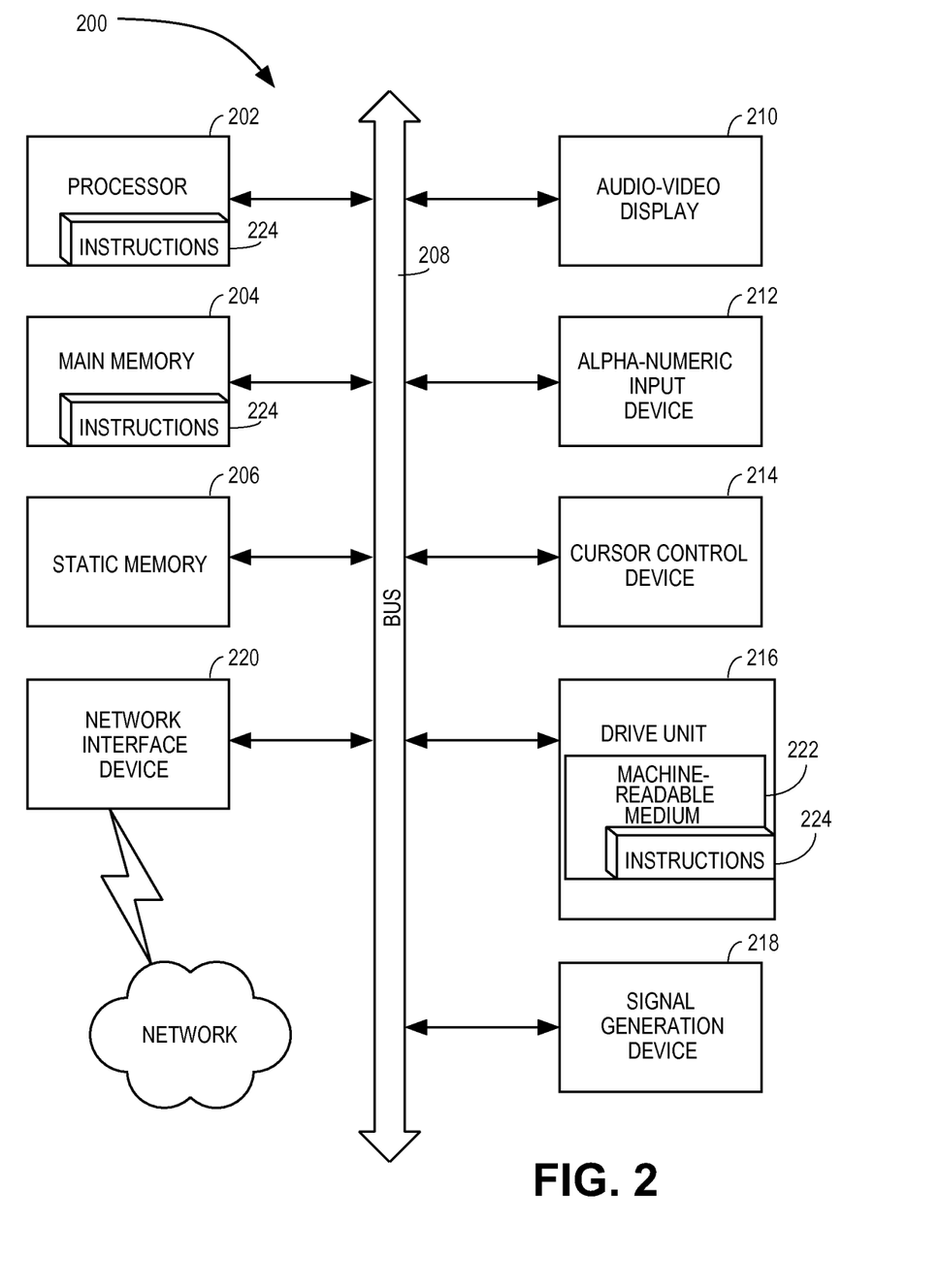
FIG. 2 is a block diagram illustrating components of a computer system, consistent with an embodiment of the present invention.

FIG. 2 shows a diagrammatic representation of a machine in the exemplary form of a computer system 200 within which a set of instructions for causing the machine to perform any one or more of the methodologies discussed herein, may be executed. In alternative embodiments, the machine may operate as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU), a graphics processing unit (GPU), or both), a main memory 204 (e.g., read only memory (ROM), flash memory, dynamic random access memory (DRAM) such as synchronous DRAM (SDRAM) or Rambus DRAM (RDRAM), etc.), and a static memory 206 (e.g., flash memory, static random access memory (SRAM), etc.), which communicate with each other via a bus 208.

The computer system 200 may further include a video display 210 (e.g., a liquid crystal display (LCD) or a cathode ray tube (CRT)). The computer system 200 may also include an alpha-numeric input device 212 (e.g., a keyboard or touch screen), a cursor control device 214 (e.g., a mouse), a disk drive unit 216, a signal generation device 218 (e.g., a speaker), and a network interface device 220.

The disk drive unit 216 includes a machine-readable medium 222 on which is stored one or more sets of instructions 224 (e.g., software) embodying any one or more of the methodologies or functions described herein. The software may also reside, completely or at least partially, within the main memory 204 and/or within the processor 202 during execution thereof by the computer system 200, the main memory 204 and the processor 202 also constituting machine-readable media.

The software may further be transmitted or received over a network 228 via the network interface device 220. Exemplary networks include Internet 30, SMS/MMS network 40, and WAP network 38.

While machine-readable medium 224 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Figure 3:
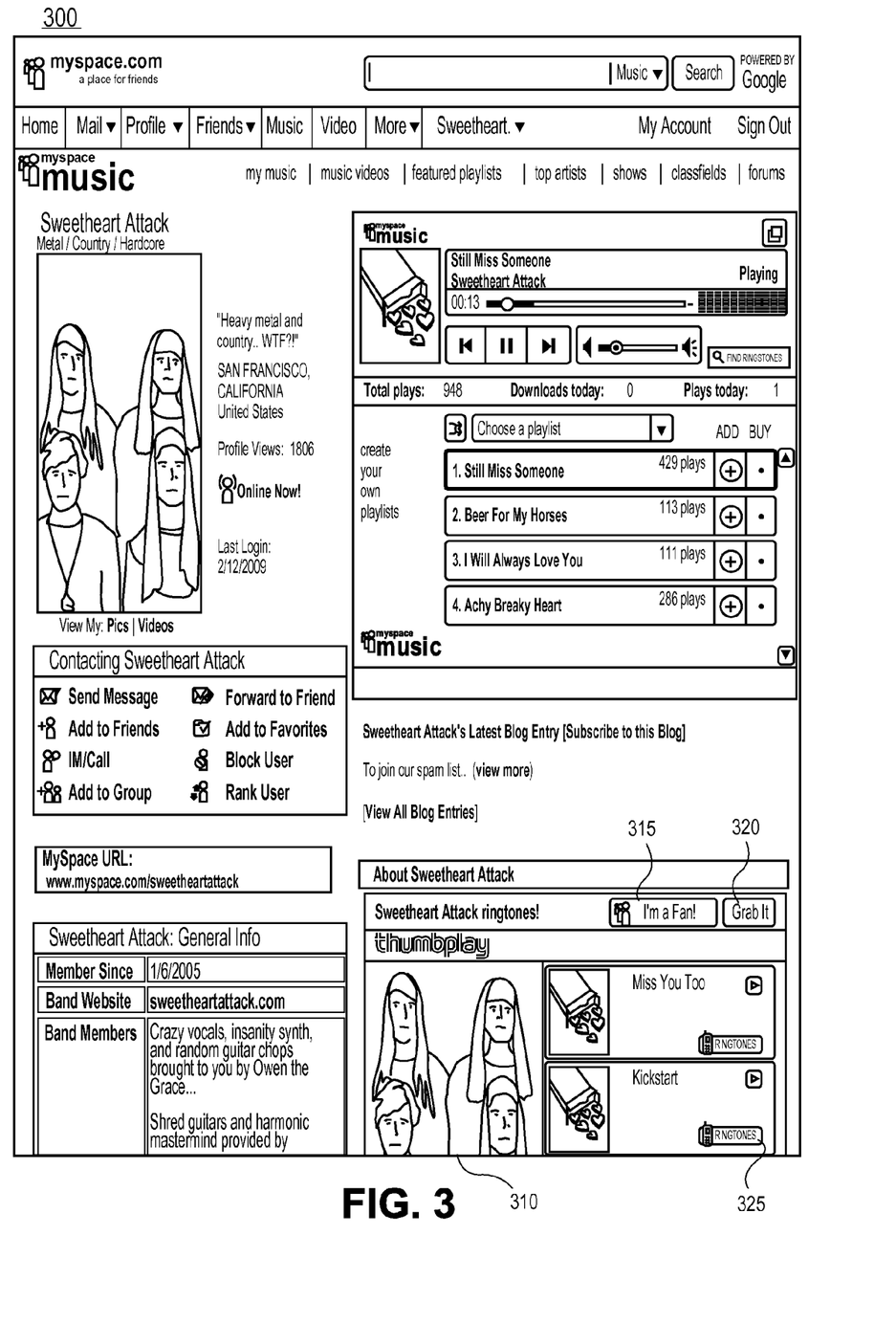
FIG. 3 is a screenshot of a page showing an exemplary GUI for providing a user with a mechanism to access a user profile and/or information associated with a user profile, consistent with an embodiment of the present invention.
Figure 4:
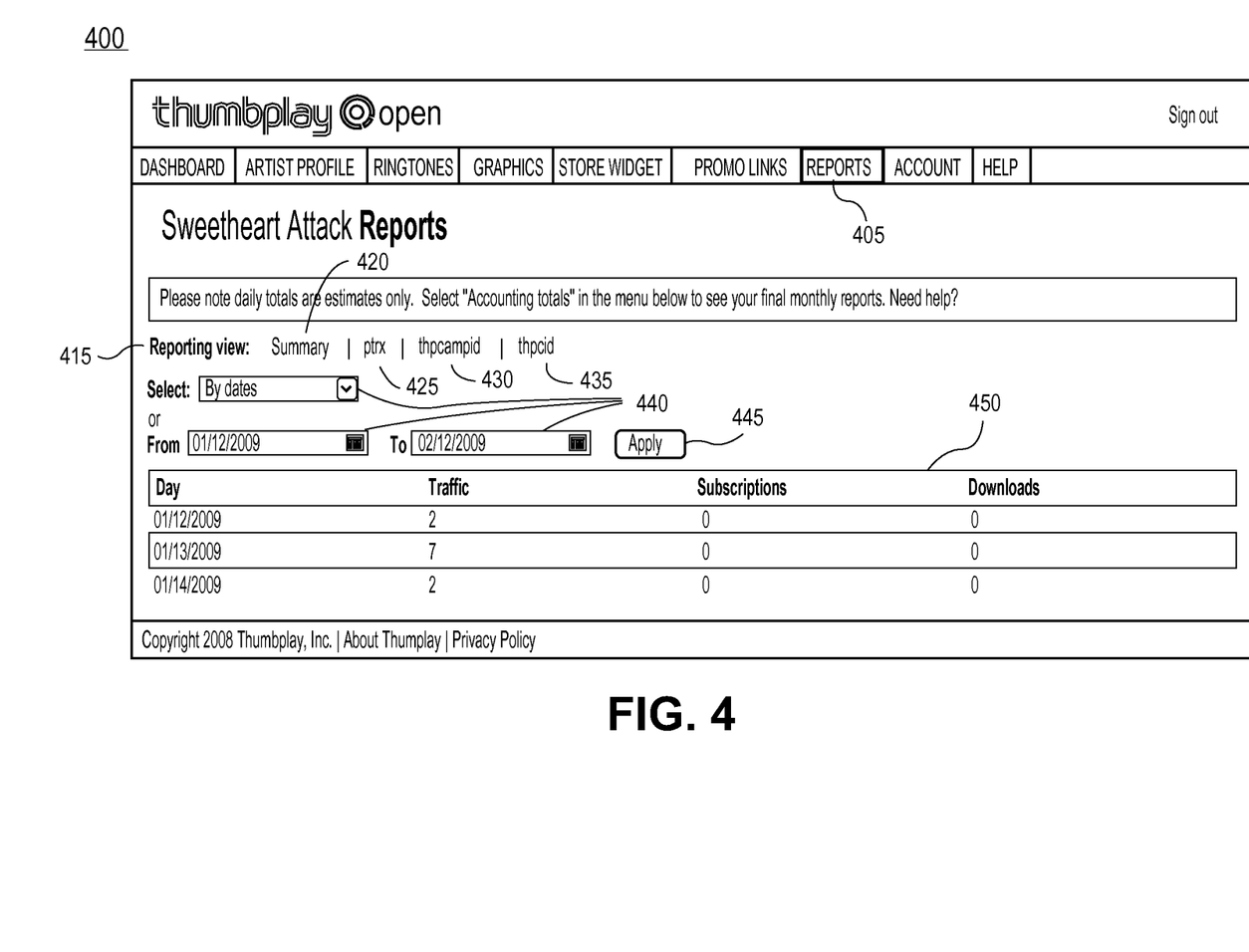
FIG. 4 is a screenshot of an exemplary GUI for providing a user with a statement of activity regarding the user profile, consistent with an embodiment of the present invention.

The GUIs of FIGS. 3 and 4 may be generated, displayed, and managed by any system and/or apparatus enabled to generate them and communicate with a user and/or a customer such as systems 10, 100, 150, and/or 200.

FIG. 3 is a screenshot of a page showing an exemplary GUI 300 for providing a user with a mechanism to access a user profile and/or information associated with a user profile. GUI 300 may be provided and/or displayed by, for example, a third party website, SMS/MMS gateway, and/or WAP site. GUI 300 includes a widget 310 and three exemplary buttons; an I'm a fan button 315, a grab it button 320, and a ringtones button 320. A customer may access and/or request access to a user profile and/or information associated with a user by selecting on or more of buttons 315, 320, and/or 325.

FIG. 4 is a screenshot of a page showing an exemplary GUI 400 for providing a user with a statement of activity regarding the user profile. GUI 400 may be displayed to a user upon selection of the reports tab 405. The name or title of the user profile may be displayed in heading 410.

A user may select a reporting view under a reporting view heading 415. Selecting a reporting view enables a user to view information related to a source of data associated with their user profile. For example, a user may have mechanisms for accessing their user profile available on various platforms or websites, such as mySpace.com, FaceBook.com, and/or a personal website. A user may wish to view information related to only one of these platforms. In this case, he or she would select the one of exemplary reporting views ptrx 425, thpcampid 430, and thpcid 435, wherein each of these reporting views is associated with a different platform or website. Upon selection of a reporting view, information regarding activity related to the selected platform or website may be displayed. When a user desires to view information related to all of the platforms or websites associated with their user profile, he or she may select the summary reporting view 420. Following this selection, a summary of all activity related to the user profile may be displayed as shown in FIG. 4.

A user may also select a manner of sorting the data shown on a report. For example, GUI 400 shows a sorting option of "by dates" 440. Other exemplary sorting options include sorting by day, week, month, or most recent activity. Optionally, one or more text boxes 440 may be displayed wherein a user may enter a date or date range for information to be shown in a statement or report. A user may select or "click on," for example, a button 445 shown on the GUI to apply the selected sorting option to the data provided on the statement or report.

Exemplary information showing activity and/or transactions regarding a user profile may be provided in table 450. Table 450 may include one or more headings that may refer to a category of information. Exemplary categories include the date, volume of traffic, and/or the number of new/existing subscriptions, and/or downloads. Information related the category and the user profile may be provided on the table under the appropriate heading.

Figure 5:
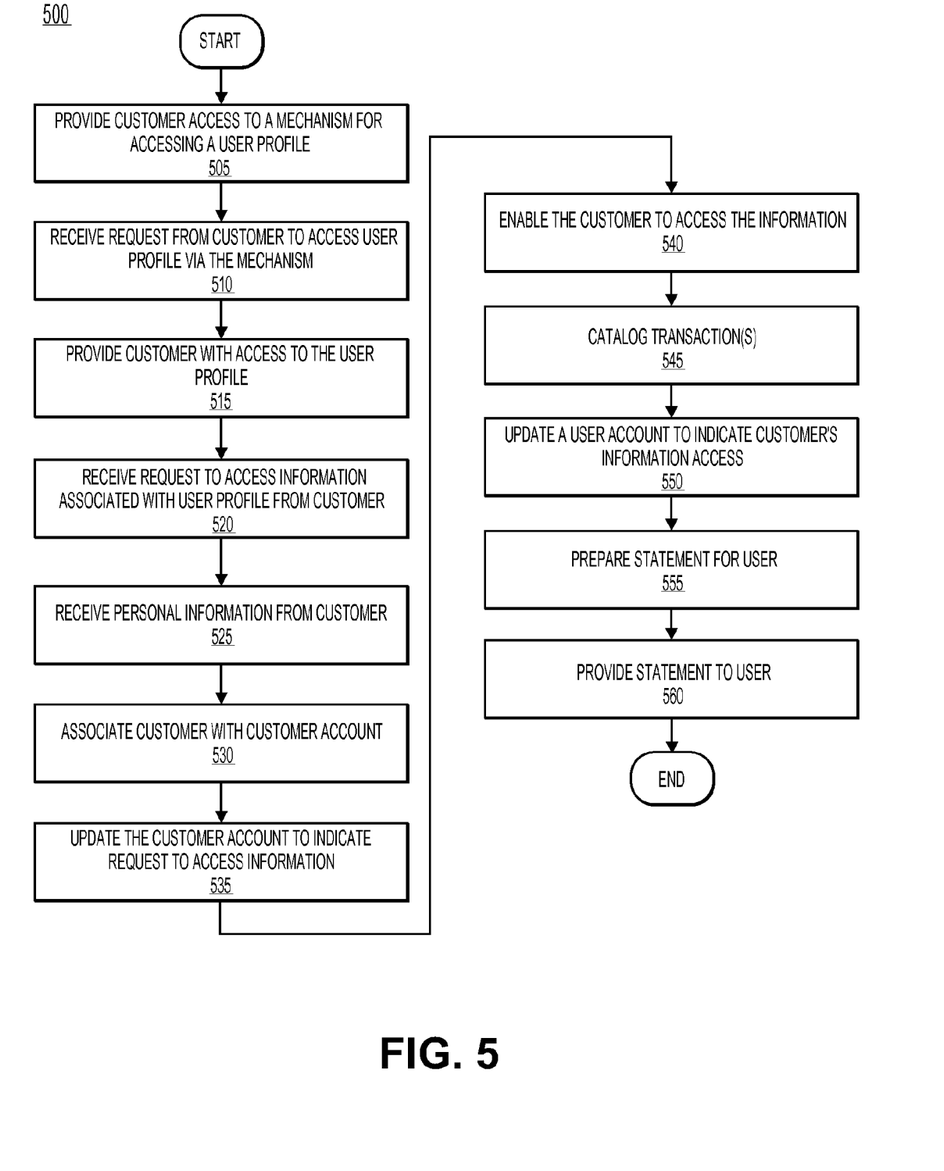
FIG. 5 is a flowchart illustrating an exemplary process 500 for enabling a customer to access information associated with a hosted user profile via a third party information source, consistent with an embodiment of the present invention.

FIG. 5 is a flowchart illustrating an exemplary process 500 for enabling a customer to access information associated with a hosted user profile via a third party information source. Exemplary third party information sources include a third party website, a third party SMS/MMS gateway, and/or a third party WAP site. A, GUI, apparatus, machine-readable media, and/or a system such as systems 100, 101, 150, and 200 may perform process 500.

In step 505, a customer may be provided with a mechanism to access the hosted user profile via the third party information source through, for example, a personal or mobile computing device. Exemplary mobile communication devices include a mobile telephone and PDA. The user profile may be hosted on, for example, a website, a SMS/MMS gateway, and a WAP site like website 48, SMS/MMS gateway 52, and WAP site 50, respectively. The mechanism may be, for example, a link or a widget that is included on a page displayed by the third party information source. An exemplary mechanism is shown in FIG. 3. The mechanism may be provided via, for example, a website, a SMS/MMS gateway, and a WAP site, such as, a user's website or a commercially available site like mySpace.com™ or FaceBook.com™.

The user profile may include information. In some cases, the information may be a media file. Exemplary media files include an MP3 file, a graphic file, a ringtone file, a document file, a game file, a wallpaper file, and a music file. In one embodiment, the information may be a subscription to, for example, information made periodically available on the hosted user profile and/or entity hosting the user profile.

In one embodiment, the user profile may be associated with a user account. A user account may include information relating to, for example, a user or administrator of the user profile, and/or information or media files associated with the user profile. A user account may include information relating to the transferring of monetary funds to and/or from the user. Monetary funds may be transferred from the user account, for example, as payment for services rendered by the entity hosting the user profile. Monetary funds may be transferred to the user account as a credit from the entity hosting the user profile for fees collected from customers who accessed information from the hosted user profile. In some embodiments, the mechanism may be provided via a plurality of third party information sources.

In step 510, a request to access the user profile may be received from a customer via, for example, the mechanism. An exemplary method for receiving the request may include selecting, by the user, the mechanism by clicking on it with a mouse.

In step 515, the customer may be provided with access to the user profile. This access may be enabled by a content delivery platform and content management system like content delivery platform and content management system 46 via, for example, a website, a SMS/MMS gateway, and a WAP site like website 48, SMS/MMS gateway 52, and WAP site 50. In step 520, a request to access information associated with a hosted user profile may be received via, for example, a website, a SMS/MMS gateway, a WAP site like website 48, SMS/MMS gateway 52, and WAP site 50.

In step 525, personal information may be received from the customer via, for example, a website, a SMS/MMS gateway, and/or a WAP site like website 48, SMS/MMS gateway 52, and/or WAP site 50, respectively. Personal information received from the customer may include, for example, the customer's name, email address, billing information, login information, and/or a password. The customer may then be associated with a customer account based on the received personal information using, for example, a subscription and purchase management system, such as subscription and purchase management system 56 and/or a financial institution like financial institution 130 (step 530). In some cases, the customer may have a previously existing customer account and may be associated with this account based on the received customer information. In other cases, a new customer account may be generated for the customer using the received personal information.

In step 535, a customer account may be updated to reflect the requested to access the information. In some embodiments, updating a customer account may include charging the customer account an amount of money and receiving payment. A customer account may be, for example, an account with a bank, a utility provider, a mobile communications provider, a telecommunications provider, a lending institution, and an electronic commerce institution, wherein the account is associated with the customer. A customer account may be resident in, for example, a file database like file database 44 and/or a customer account module, like customer account module 120. Updating the customer account may be performed by, for example, a subscription and purchase management system, such as subscription and purchase management system 56 and/or a financial institution like financial institution 130. To update a customer's account, a payment for accessing the requested media file may be transferred from a customer and/or customer account. Updating the customer account may include, for example, an electronic funds transfer, or a credit card, debit card, or PayPal™ transaction.

In step 540, a customer may be enabled to access the requested information via, for example, a content delivery platform and/or content management system such as content delivery platform and content management system 46 or a website, a SMS/MMS gateway, and/or a WAP site such as website 48, SMS/MMS gateway 52, and/or WAP site 50, respectively. In some embodiments, accessing the information may include downloading the information.

In step 545, one or more transactions of process 500 may be cataloged using, for example, a content delivery platform and content management system like content delivery platform and content management system 46.

In step 550, a user's account may be updated to, for example, indicate a customer's information access. A subscription and purchase management system, such as subscription and purchase management system 56 and/or a financial institution like financial institution 130 may be used to update the user's account. Updating a user account may include, for example, issuing or receiving an electronic funds transfer and/or a paper check that may be, for example, transferred from a payment received by the entity hosting the user profile.

In step 555, a statement may be prepared for the user using, for example, a subscription and purchase management system, such as subscription and purchase management system 56 and/or a financial institution like financial institution 130. This statement may include information regarding various transactions related to the user profile, information associated with the user profile, and/or a website, a SMS/MMS gateway, and a WAP site like host website 48, SMS/MMS gateway 52, and WAP site 50, respectively including the status or cost of a transaction, and/or any credit due, or debt owed, by the user. In embodiments where a plurality of mechanisms are provided to a user, the statement may include information associated with each of the plurality of mechanisms. In step 560, the statement may be provided to the user via, for example, the content delivery platform and content management system. An exemplary statement provided to a user is shown in FIG. 4. Following step 560, process 500 may end.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

The invention claimed is:

1. A method comprising:
   maintaining, on a server computer system, a user account established by a user and associated with a hosted user profile accessible via a plurality of third-party information sources, wherein the plurality of third-party information sources includes a third-party social media website and a personal website associated with the user, and wherein the hosted user profile includes associated information indicating media files uploaded by a user associated with the user account;
   receiving, from a customer through the hosted user profile via at least one of the plurality of third-party information sources, a request to access the media files indicated by the associated information via at least one of a plurality of communication links;
   in response to receiving the request, enabling the customer to access the media files via the at least one of the plurality of third-party information sources, using a content delivery platform and content management system;
   updating the user account to include updated user account information indicating that the customer was enabled to access to the media files via the at least one of the plurality of third-party information sources, using a subscription and purchase management system;
   receiving a user selection indicating a selection by a user of one or more selected third-party information sources of the plurality of third-party information sources; and
   providing the user with a hosted user profile activity statement based on the updated user account information, the hosted user profile activity statement tailored to display activity information associated with access by the customer to the media files via the one or more selected third-party information sources, using the content delivery platform and content management system.

2. The method of claim 1, wherein the media files include at least one of an MP3 file, a graphic file, a ringtone file, a document file, a game file, a wallpaper file, and a music file.

3. The method of claim 1, wherein the associated information includes subscription information.

4. The method of claim 1, wherein the customer accesses the associated information via the at least one of the plurality of third-party information sources through a mobile device.

5. The method of claim 1, wherein updating the user account includes transferring a portion of a payment received to the user account.

6. The method of claim 1, wherein additional hosted user profile activity statements are prepared based on updated user account information relating to each corresponding one of the plurality third-party information sources.

7. The method of claim 1, wherein enabling the customer to access the media file includes enabling the customer to download the media file.

8. A system comprising:
   a network, wherein the network is enabled to facilitate communication between a user associated with a user account, a customer, and a server computer system; and
   the server computer system, wherein the server computer system is enabled to:
   maintain a user account established by a user and associated with a hosted user profile accessible via a plurality of third-party information sources, wherein the plurality of third-party information sources includes a third-party social media website and a personal website associated with the user, and wherein the hosted user profile includes associated information indicating media files uploaded by the user;

receiving, from a customer through the hosted user profile via at least one of the plurality of third-party information sources, a request to access one of the media files uploaded by the user;

in response to receiving the request, enable the customer to access the one of the media files via the at least one of the plurality of third-party information sources;

update the user account to include updated user account information indicating that the customer was enabled to access the media files via the at least one of the plurality of third-party information sources;

receive a user selection indicating a selected third-party information source of the plurality of third-party information sources; and prepare and provide a hosted user profile activity statement for the user based on the updated user account information, the hosted user profile activity statement tailored to display activity information associated with access by the customer to the media files via the selected third-party information source.

9. The system of claim 8, wherein the associated information includes subscription information.

10. The system of claim 8, wherein access to the media file includes downloading the media file.

11. An apparatus comprising:
a network, wherein the network is enabled to facilitate communication between a user associated with a user account, a customer, and a server computer system; wherein the server computer system is configured to:
maintain a user account established by a user and associated with a hosted user profile accessible via a plurality of third-party information sources, wherein the plurality of third-party information sources includes a third-party social media website and a personal website associated with the user;
provide the customer with one of a plurality of communication links, via at least one of a plurality of third-party information sources, to access the hosted user profile hosted by a hosting entity, the hosted user profile includes associated information related to media files uploaded by the user;
in response to receiving from a customer a request to access the associated information via the one of the plurality of communication links, enable the customer to access the information via the at least one of the plurality of third-party information sources;
update the user profile associated with the user account to include updated user account information indicating the customer's access to the associated information via the at least one of the plurality of third-party information sources based on the one of the plurality of communication links;
receive a user selection indicating a selected third-party information source of the plurality of third-party information sources; and
prepare and provide a user profile activity statement for the user based on the updated user account information, the user profile activity statement tailored to display activity information associated with access by the customer to the media files via the selected third-party information source.

12. The apparatus of claim 11, wherein the associated information includes subscription information.

13. The apparatus of claim 11, wherein access to the media file includes downloading the media file.

14. A graphic user interface (GUI), wherein the GUI enables performance of the following operations:
maintaining, on a server computer system, a user account established by a user and associated with a hosted user profile accessible via a plurality of third-party information sources, wherein the plurality of third-party information sources includes a third-party social media website and a personal website associated with the user;
providing a customer with a plurality of communication links via a plurality of third-party information sources, each of the plurality of communication links enable access to a user profile hosted by a host entity via at least one of the plurality of third-party information sources, the user profile includes associated information indicating media files uploaded by a user associated with the user account;
in response to receiving a request to access the associated information from a customer via at least one of the plurality of communication links, enabling the customer to access the media files via at least one of the plurality of third-party information sources, using a content delivery platform and content management system;
updating the user profile associated with the user account to include updated user account information indicating the customer's access to the media files via the at least one of the plurality of third-party information sources based on the at least one of the plurality of communication links, using a subscription and purchase management system;
receiving a user selection indicating a selected third-party information source of the plurality of third-party information sources; and
providing the user with a user profile activity statement based on the updated user account information, the user profile activity statement tailored to display activity information associated with access by the customer to the media files via the selected third-party information source, using the content delivery platform and content management system.

15. The GUI of claim 14, wherein the associated information includes subscription information.

16. The GUI of claim 14, wherein access to the media file includes downloading the media file.

17. A non-transitory machine-readable media including instructions that enable a machine to perform the following operations:
maintaining, on a server computer system, a user account established by a user and associated with a hosted user profile accessible via a plurality of third-party information sources, wherein the plurality of third-party information sources includes a third-party social media website and a personal website associated with the user;
providing a customer with a plurality of communication links via a plurality of third-party information sources, each of the plurality of communication links enable access to a user profile hosted by a host entity via at least one of the plurality of third-party information sources, the user profile includes associated information based on data uploaded by a user associated with the user account, wherein the data uploaded by the user includes media files;

in response to receiving a request to access the associated information from a customer via at least one of the plurality of communication links, enabling the customer to access the associated information via at least one of the plurality of third-party information sources, using a content delivery platform and content management system;

updating the user profile associated with the user account to include updated user account information indicating the customer's access to the media files via the at least one of the plurality of third-party information sources based on the at least one of the plurality of communication links, using a subscription and purchase management system;

receiving a user selection indicating a selected third-party information source of the plurality of third-party information sources; and providing the user with a user profile activity statement based on the updated user account information, the user profile activity statement tailored to display activity information associated with access by the customer to the media files via the selected third-party information source, using the content delivery platform and content management system.

18. The non-transitory machine-readable media of claim 17, wherein the associated information includes subscription information.

19. The non-transitory machine-readable media of claim 17, wherein access to the media file includes downloading the media file.

* * * * *